Jan. 30, 1940. G. H. PFEFFERLE 2,188,302
MEANS FOR STOPPING LEAKS IN PIPE LINES
Filed Sept. 27, 1938 3 Sheets-Sheet 3

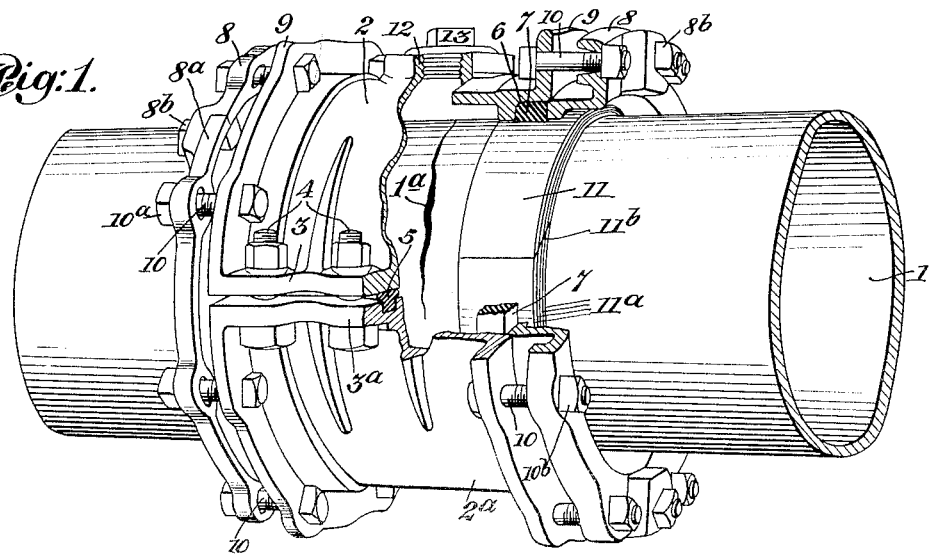

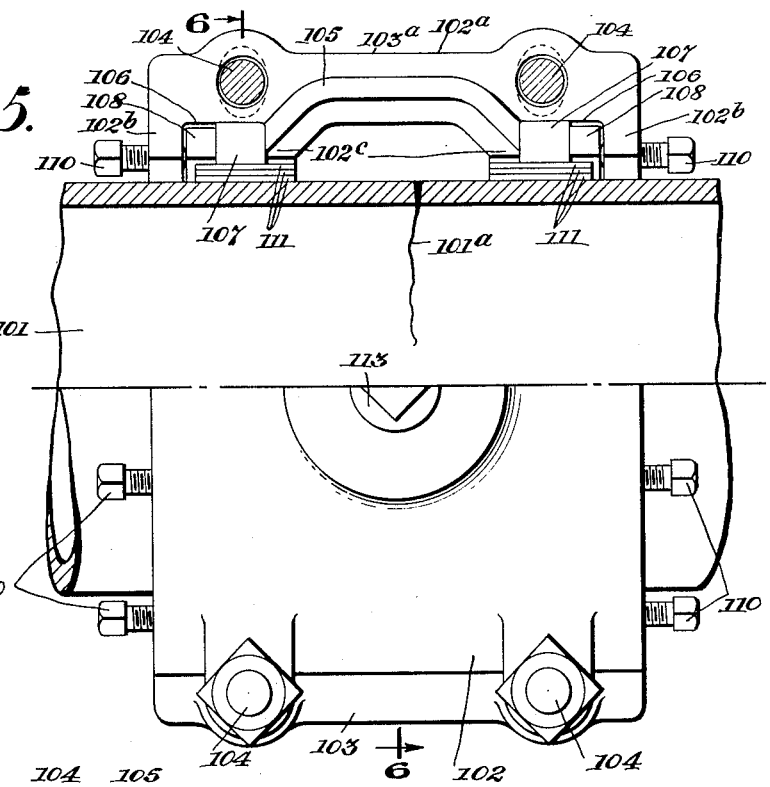
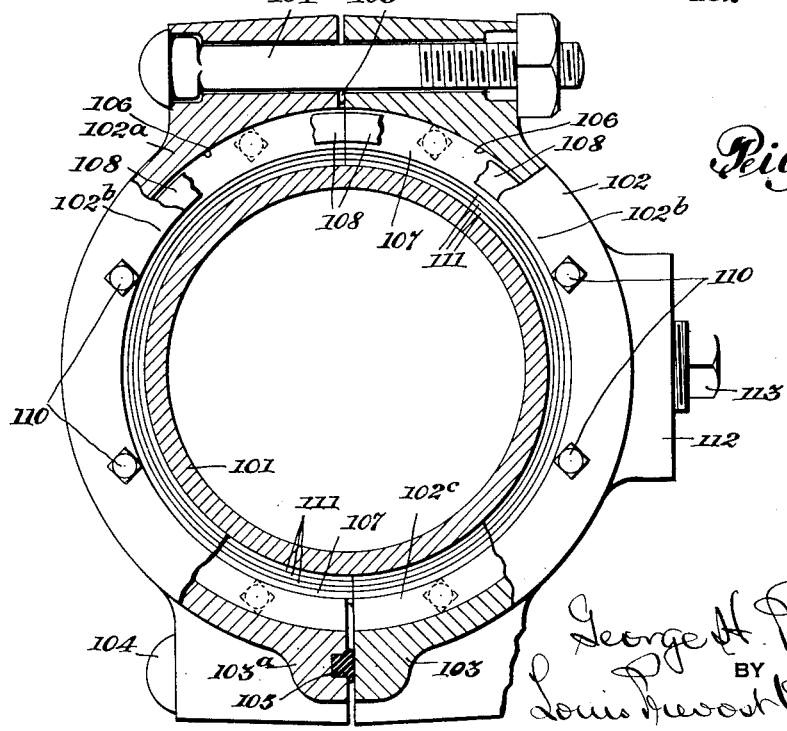

INVENTOR
George H. Pfefferle
BY
Louis Prevost Whitaker
ATTORNEY

Patented Jan. 30, 1940

2,188,302

UNITED STATES PATENT OFFICE 2,188,302

MEANS FOR STOPPING LEAKS IN PIPE LINES

George H. Pfefferle, Bradford, Pa., assignor, by mesne assignments, to Dresser Manufacturing Company, Bradford, Pa., a corporation of Pennsylvania Application September 27, 1938, Serial No. 231,875

9 Claims. (Cl. 138—99)

My invention consists in the novel features hereinafter described, reference being had to the accompanying drawings, which show one embodiment of means for carrying my invention into effect, and a slight modification of the same, selected by me for purposes of illustration, and the said invention is fully disclosed in the following description and claims.

For the purpose of making a repair to a pipe line, various types of split sleeves have been developed, which comprise ordinarily a sleeve, usually of cast iron, formed in halves, to permit it to be assembled around the pipe in a line, and having side packings or gaskets between laterally opposed flanges of the sleeve sections to render the sleeve tight when placed in position over the leaking portion of the pipe, the sleeve being provided with packing recesses at its ends, to receive gaskets which are compressed by followers, also usually made in segments or halves to permit their being placed around the pipe, the followers being connected by through bolts, or connected to the sleeve at its opposite ends by short bolts for the purpose of forcing the followers toward the sleeve and thereby compressing the end packings. These split sleeves find their greatest use in connection with cast iron pipe sections, and a serious obstacle to their use is found in the fact that cast iron pipe sections of any standard nominal diameter vary exceedingly in their external diameter.

Much of the cast iron pipe with which it is desirable to use split sleeves, was made long before any standards were developed, such as those of the American Gas Association and the American Water Works Association. Many gas and water companies do not know what the outside diameters of the pipe sections in their pipe lines are, but simply know the nominal diameter of the pipe as 6 inches or 8 inches, etc. It therefore results that stock sleeves made for the American Gas Association and the American Water Works Association standard pipe are useless because the particular cast iron pipe to be repaired is too small or too great in its exterior diameter to be usable with such stock sleeves. In such case, it is necessary to resort to foundry sleeves which are caulked with lead. It also frequently happens that steel and cast iron pipes are laid indiscriminately in a particular distribution line. The outside diameter of a six inch pipe, for example, may vary between six and five-eighths and seven and one-tenth inches outside diameter. It is obvious that stock sleeves carried by the owner of the pipe line for the maximum size pipe on which they might be used would be unusable on the small size. It is also obvious that an enormous and impracticable pattern expense would be required to furnish split sleeves in the wide range of sizes which are actually demanded by the variations in the external diameter of pipes, and even if such a variety of sizes were available, many of them might be called for only at extremely long intervals. My present invention is directed to the solution of this problem, and enables me to adjust split sleeves of a given size to many varying external diameters of pipe sections.

According to my invention, I provide an equalizing packing, preferably composed of a plurality of convolutions of thin sheet rubber or rubber composition, and having a thickness sufficient to compensate for the distance between the inner face of the end packing and the exterior of the pipe to be repaired, on each side of the crack or leak, and substantially centrally with respect to the respective end packings of the sleeve. Preferably the thickness of the compensating packings will be a little greater than required for such compensations and adjustment can then be made in diametral spaces equivalent to the thickness of the rubber layers when the sleeve is placed in position around the pipe with the end gaskets in contact with the compensating packings. With the side packings in place and under the desired compensation, and with the end packings and followers and clamping bolts in place, when the clamping bolts are tightened and the followers are forced inwardly against the end packings, the end packings will be distorted by the pressure and forced inwardly against the laminated compensating packings indenting the same, and forcing them into fluid tight contact with the pipe, thus enabling a single repair sleeve to be used effectively and satifactorily with pipe sections varying greatly in external diameter.

Referring to the accompanying drawings,

Fig. 1 represents a perspective view, partly in section, and partly broken away, showing a split sleeve applied to a defective pipe section, in accordance with my invention.

Fig. 2 is a detailed sectional view of the portions of one end of the sleeve and the adjacent wall of the pipe section.

Fig. 3 is a detailed view, partly in section, showing one-half of the sleeve and the adjacent pipe wall and illustrating the arrangement of the side packing with respect to the other parts.

Fig. 4 is a detailed perspective view of one form in which the compensating packings may be furnished.

Fig. 5 represents a side elevation, partly in section, of a modified form of split sleeve embodying my invention.

Fig. 6 is a section of the complete sleeve, on the line 6—6 of Fig. 5.

Figure 7:
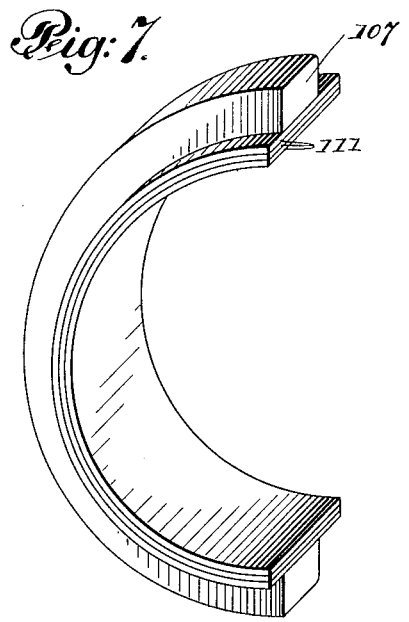
Fig. 7 is a perspective view of the half gasket assembly as used at each end of each half of the sleeve.

In the form of my invention shown in Figs. 1 to 4 inclusive, 1, represents a section of cast iron pipe, for example, which has developed a crack, indicated at 1a, and is leaking. 2 and 2a represent the opposed halves of the split sleeve provided with opposed side flanges 3, 3a having registering bolt holes for the reception of the side bolts 4, 4 and provided with side packings of any suitable or desired type, one of which is indicated at 5 in Figs. 1 and 3.

The sleeve is provided at each end with an annular packing recess 6, which receives a gasket 7. The gasket 7 may be formed from a straight strip of the required dimensions or may be formed as an annular gasket and cut diagonally at one point in a well known way to enable it to be placed around the pipe, or cut in halves by radial cuts, as preferred. 8 represents the followers which, in this instance, are formed in two parts with overlapping portions 8a, united by section bolts 8b, as shown in Fig. 1, the followers being provided with flanges having a circular series of bolt holes registering with a circular series of bolt holes in the end flanges 9, on the sleeve sections 2 and 2a. In this instance, the followers are drawn up against the end packings 7 by means of short bolts 10 and nuts 10a, engaging the registering apertures of the followers and end flanges. Obviously, the followers may be drawn up, if desired, by means of through bolts in a well known way.

Assuming that the pipe 1 is of smaller diameter than that for which the sleeve was originally intended, the pipe is provided at each side of the leak with the compensating packings indicated at 11, 11. Each of these packings is composed of a plurality of convolutions 11a, of thin rubber or rubber composition. These compensating packings may be formed by employing a long strip of sheet rubber or rubber composition and winding the same around the pipe at such distances apart that the compensating packings so formed will have their centers substantially in line with the centers of the end packings 7, as clearly indicated in Fig. 3. I prefer to make one or both faces of the rubber strip forming the compensating packing, adhesive, in any usual or preferred manner, so that, if the strip used is long, and wound to produce the desired thickness, it will maintain itself upon the pipe at whatsoever thickness is provided by the necessary number of convolutions. In some instances, I may provide the compensating packings 11 in the form indicated in Fig. 4, for example, by winding the convolutions of rubber upon a mandrel, and upon each other, so as to produce a coil having an internal and external diameter sufficient to accommodate any ordinary variation in cast iron pipe of the standard size with which it is to be used, the convolutions being united adhesively throughout their entire extent in any usual or well known manner, so that either the outermost convolution or innermost convolution may be removed, if desired, to make the coil exactly the right size to fit between the inner face of the end packing 7 and the outer face of the pipe. The coil 11 can be cut diagonally, as indicated at 11b, to permit it to be placed in position around the pipe with the ends overlapping, as indicated in Figs. 1 to 4.

It will be seen that with the parts of the clamp in position and the compensating packings 11, 11 engaged centrally by the end packings 7, as soon as the bolts 10 are drawn up, the end packings will be compressed and caused to expand inwardly, thereby indenting the laminations of the compensating packings 11, making a fluid tight joint with the outer convolutions thereof, and forcing the innermost convolution into fluid tight engagement with the exterior of the pipe. As usual, the sleeve is shown provided in one of its halves with a vent aperture 12 to permit escape of fluid while the sleeve is being tightened up, after which it is closed by the usual plug 13.

Figure 11:
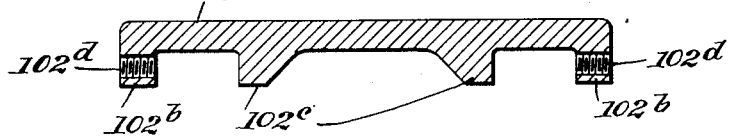
Fig. 11 is a longitudinal section of the sleeve at a point between the opposed side flanges.

In Figs. 5 and 6 I have illustrated a slight modification of my invention, and in these figures the parts corresponding with those shown in Figs. 1 to 4 inclusive, are given the same reference numerals with the addition of 100. In this embodiment of my invention, the opposed halves of the split sleeve are indicated at 102 and 102a, said halves being provided with opposed side flanges 103 and 103a, and registering holes for the reception of the side bolts 104, 104, the meeting faces of the side flanges being provided, the one with a packing engaging recess to receive the side packings, indicated at 105, 105, and the other being smooth to engage projecting portions of the side packings and compress them in order to make a tight joint along each side of the sleeve. At each end of each half of the sleeve, there is provided a packing recess 106, formed between an exterior inwardly projecting flange 102b, and an interior inwardly projecting flange 102c, as best seen in Fig. 11. Each of these packing recesses receives one half of an end packing or gasket, which is placed therein in the form of a half circle, the ends of which are flush with the adjacent faces of the side flanges. These end packings or gaskets, are indicated at 107. They may be conveniently formed by cutting a circular gasket in half or they may be formed from straight gasket material cut to the proper length, and bent into semi-circular form, as preferred. Each of the packing recesses 106 is of sufficient width longitudinally of the sleeve, to accommodate also a metal follower, indicated at 108, which is also formed in halves and preferably has its interior diameter slightly less than, and its interior diameter slightly greater than, the corresponding diameters of the gaskets 107. The exterior flanges of each half of the sleeve, indicated at 102b, are provided with a semi-circular series of threaded apertures 102d, to receive short threaded bolts or screws 110, which as clearly shown in the drawings, may be screwed into the threaded apertures and into contact with the follower section, and thus force the follower section against the gasket section 107, so as to compress it in the direction of the longitudinal axis of the sleeve and expand it inwardly in a direction toward the surface of the pipe.

In this instance the compensating packing, indicated at 111, is formed by cutting a number of strips of sheet rubber or other suitable material of the desired dimensions, and preferably of greater width than the end gaskets, to such lengths that when they are placed together and flexed to a semi-circle corresponding with the curvature of the half gasket 107, their ends will be flush with the cut end surfaces of the gasket section. The outer strip of the laminations is cemented to the inside of the end gasket half, and the balance of the strips are cemented together in place, as illustrated in the drawings, see particularly Fig. 7. The ends are then trimmed flush if necessary, to provide a satisfactory packing surface at the meeting ends of the half of the gasket and connected laminations, or compensating packing, it being understood that the sections or laminations of the compensating packing are cemented together and to the half of the end gasket in such manner that the innermost layers of the laminations may be peeled away in the field, as may be desirable; to accommodate the exterior diameter of the particular pipe with which the sleeve is to be used.

Each half of the end packing will therefore have secured to it a corresponding half of the compensating packing formed of the laminations, as hereinbefore described. This makes for great convenience in handling the sections of the sleeves from the time they are manufactured and assembled, to the time in the field when they are placed in operative position, as each half section of the sleeve is provided with its half follower and half end packing, and half compensating packing, after which the screws 110 are turned up finger tight, so as to hold these parts in their proper position in the half sleeve. Each half sleeve, therefore, including the half follower, half end packing, and half compensating packing, is handled as a unit in shipping and in field assembly, the side packings 105 being placed in the grooves provided therefor, and the side bolts being passed through the bolt apertures of one section of the sleeve or the other, and provided with nuts so that they will not become disconnected from the section. Of course if it is desired, the entire sleeve may be assembled and held together temporarily if not too large, until it is necessary to use it in the field.

When the sleeve is to be used to repair a leak, the side bolts are removed; the requisite number of laminations of the compensating packing 111 are peeled off from the inner faces of the compensating packings; the halves of the sleeves are placed around the pipe over the leak; the side bolts are inserted and drawn up, after which the end screws are screwed up to compress the end gasket upon the laminated compensating packing, in the manner previously described, and the plug 113, is inserted in the vent aperture 112 to complete the repair.

Figure 8:
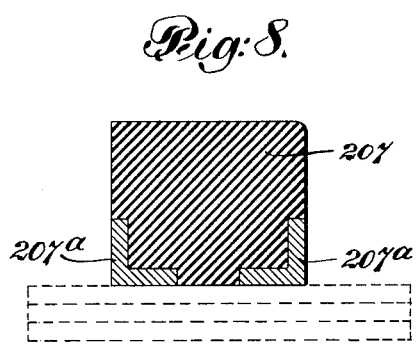
Fig. 8 is a sectional view of a modified form of gasket which I may employ in some instances.

In some instances, as where the contents of the line or substances in the soil, or both, are injurious to rubber, I prefer to provide the edge portions of the inner face and adjacent portions of the sides of the gasket section with suitable material, as lead, duck or other preferred material to protect it against such injurious influences. Thus, in Fig. 8, I have indicated at 207 a cross sectional view of a gasket half, provided with curved protecting angle sections, rectangular in cross section, which embrace the inner corners of the gasket section, and are preferably embedded therein, or molded therein, so as to be flush with the inner faces of the gasket section, and the adjacent sides. These protecting devices are indicated at 207a and may be formed of lead, duck, or any other suitable material.

The laminations of the compensating packing may also be protected by forming their lateral edges with sections of lead or other suitable material as lead or duck between which the rubber portions are molded.

Figure 9:
Fig. 9 is a detail sectional view of a modified form of one of the laminations of the compensating packing.

Fig. 9 shows a sectional view of one of these laminations, which is indicated as a whole at 211, the central portion 211a being of rubber with lateral portions 211b, formed of lead or duck or other suitable material united to the central rubber portion. It will be seen that these rubber laminations can be built up and bent into semi-circular form in the same manner as if they were composed entirely of rubber sheet material.

Figure 10:
Fig. 10 is a sectional view of another form of one of the laminations of which the compensating packings may be formed.

In some instances it is desirable to reinforce the laminations of the compensating packing in order to prevent distention of the rubber sections thereof, in a direction longitudinally of the pipe, and effectively conserving all the force exerted against the laminations for sealing against the pipe surface. In Fig. 10, I have shown such a lamination for use in the compensating packing. The lamination is indicated at 211c, and is shown as provided with a wire mesh or fabric insert 211d, moulded therein. Such mesh or fabric inserts do not reduce materially the flexibility of the laminations, and do not therefore detract from its ability to conform to the irregularities of the pipe surface, while it has considerable effect in preventing the expansion or distension of the rubber longitudinally of the pipe.

By my invention, as previously stated, variations in the external diameter of pipe sections, and particularly of cast iron pipe sections which so greatly vary in exterior diameter, may be fully compensated for, and it is only necessary for the owner of the pipe line to carry in stock a single size of repair sleeve for each of the standard internal diameters of pipe in their lines to make all necessary repairs.

What I claim and desire to secure by Letters Patent is:

1. In a leak repair device for pipe lines, the combination with a repair sleeve provided with annular gaskets, of compensating packings comprising a plurality of convolutions of rubber sheet material interposed between the inner faces of the annular gaskets and the exterior surface of the pipe to compensate for variations in the exterior diameters of the pipe sections.

2. In a leak repair device for pipe lines, the combination with a repair sleeve provided with annular gaskets, and means for compressing the same in a direction parallel to the axis of the pipe, of compensating packings comprising a plurality of convolutions of rubber sheet material adhesively united and interposed between the inner faces of said annular gaskets and the exterior surface of the pipe, to compensate for variations in the exterior diameters of the pipe sections.

3. In a leak repair device for pipe lines, the combination with a repair sleeve provided with annular gaskets, and means for compressing the same in a direction parallel to the axis of the pipe, of compensating packings comprising a plurality of layers of sheet rubber material adhesively united to form an annular laminated body, and severed at at least one point to permit it to be placed around the pipe section, said packings being interposed between the inner faces of the gaskets and the exterior surface of the pipe to compensate for variations in the exterior diameter of the pipe, whereby laminations may be removed from the interior or exterior of said compensating packings to adjust them to a particular installation.

4. In a leak repair device for pipe lines, the combination of a repair sleeve formed in sections, each section being provided at each end with a semi-circular packing recess, a semi-circular gasket section therein, a semi-circular follower section, and compressing means engaging the same, a semi-circular compensating packing section comprising laminations separately united, the outermost of said laminations being united to the inner face of the gasket section, whereby said compressing means may be operated to hold the parts in assembled relation, side packings and side bolts for clamping the sleeve sections together upon the side packings.

5. In a leak repair device for pipe lines, the combination of a sleeve formed in sections, each section being provided at each end with a pair of inwardly extending flanges forming a semi-annular packing recess, a half gasket in each of said recesses, a half follower in each of said recesses, screws extending through the exterior flange of each recess to engage the follower therein, a semi-circular compensating packing section for each gasket section, comprising a plurality of laminations separably united to each other, the outermost lamination being united to the inner face of the adjacent gasket section, whereby by turning up said screws, each sleeve and section and its packing elements may be held in assembled relation, side packings and side bolts for clamping the sleeve sections upon said side packings.

6. As an article of manufacture, a compensating packing comprising a plurality of laminations of sheet rubber material, adhesively and separably united, said packing being severed at at least one point to facilitate its application to a pipe line section, whereby layers may be removed from the inner or outer surfaces of the said packing to compensate for variations between interior dimensions of a repair sleeve gasket and the exterior surface of the pipe with which it is used.

7. As an article of manufacture, a compensating packing comprising a plurality of laminations of rubber material, said laminations having their edges provided with protecting material, and being adhesively and separably united.

8. As an article of manufacture, a gasket section curved to fit the end recess in a sleeve segment, and provided on its inner face with a compensating packing segment formed of laminations separably and adhesively united, the outermost lamination being united to the inner face of the gasket section and the end faces of the laminations being flush with the end faces of the gasket section.

9. As an article of manufacture, a gasket section curved to fit the end recess in a sleeve segment, and provided on its inner face with a compensating packing segment formed of laminations separably and adhesively united, the outermost lamination being united to the inner face of the gasket section and the end faces of the laminations being flush with the end faces of the gasket section, said laminations being formed of rubber material and having a woven reinforcing fabric therein extending parallel to the opposite faces of said laminations.

GEORGE H. PFEFFERLE.